United States Patent
Jing

(10) Patent No.: US 9,965,468 B2
(45) Date of Patent: May 8, 2018

(54) METHOD AND APPARATUS FOR ACQUIRING NETWORK RESOURCE

(71) Applicant: Huawei Device Co., Ltd., Shenzhen (CN)

(72) Inventor: Hao Jing, Shenzhen (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 72 days.

(21) Appl. No.: 15/024,461

(22) PCT Filed: Nov. 29, 2013

(86) PCT No.: PCT/CN2013/088220
§ 371 (c)(1),
(2) Date: Mar. 24, 2016

(87) PCT Pub. No.: WO2015/078005
PCT Pub. Date: Jun. 4, 2015

(65) Prior Publication Data
US 2016/0217132 A1    Jul. 28, 2016

(51) Int. Cl.
*G06F 17/20* (2006.01)
*G06F 17/28* (2006.01)
(Continued)

(52) U.S. Cl.
CPC .......... *G06F 17/289* (2013.01); *G06F 17/271* (2013.01); *G06F 17/275* (2013.01);
(Continued)

(58) Field of Classification Search
None
See application file for complete search history.

(56) References Cited

U.S. PATENT DOCUMENTS

2002/0019839 A1    2/2002   Shiu
2003/0012558 A1    1/2003   Kim et al.
(Continued)

FOREIGN PATENT DOCUMENTS

CN    1395422 A    2/2003
CN    1448866 A    10/2003
(Continued)

OTHER PUBLICATIONS

Partial English Translation and Abstract of Chinese Patent Application No. CN101567906, Part 1, Mar. 26, 2016, 6 pages.
(Continued)

*Primary Examiner* — Kevin Ky
(74) *Attorney, Agent, or Firm* — Conley Rose, P.C.

(57) ABSTRACT

A method and an apparatus for acquiring a network resource where the method includes extracting language configuration information of a browser, and placing the language configuration information into a language list, sending a hypertext transfer protocol (HTTP) request to a web server, locating a position of a media element, matching a value of a language attribute of a specified resource element in the media element with the language information in the language list, selecting a media resource address, and finally according to the media resource address, requesting a media resource from the web server and loading the media resource. Hence, the browser can automatically select a media file of a specified language version according to a language preference of a user, thereby reducing a workload of a website developer. Additionally, the user does not need to perform manual selection, thereby enhancing user experience.

9 Claims, 5 Drawing Sheets

(51) Int. Cl.
  G06F 17/30    (2006.01)
  G06F 17/27    (2006.01)
  H04L 29/08    (2006.01)
(52) U.S. Cl.
  CPC ........ *G06F 17/30* (2013.01); *G06F 17/30749* (2013.01); *G06F 17/30817* (2013.01); *G06F 17/30861* (2013.01); *G06F 17/30882* (2013.01); *H04L 67/02* (2013.01)

(56) References Cited

U.S. PATENT DOCUMENTS

| | | |
|---|---|---|
| 2003/0187827 A1 | 10/2003 | Sumitomo |
| 2005/0038927 A1 | 2/2005 | Choi et al. |
| 2006/0218133 A1 | 9/2006 | Atkin et al. |
| 2011/0302512 A1 | 12/2011 | Ishii |
| 2012/0042047 A1* | 2/2012 | Chen .................. G06F 1/12 709/219 |
| 2012/0316860 A1* | 12/2012 | Reitan ................ G06F 17/289 704/2 |
| 2014/0040312 A1* | 2/2014 | Gorman ............. G06F 17/2785 707/771 |
| 2014/0101190 A1* | 4/2014 | Onoda .............. G06F 17/30887 707/758 |
| 2014/0129729 A1* | 5/2014 | Tandon .............. H04N 21/4524 709/231 |

FOREIGN PATENT DOCUMENTS

| CN | 1581123 A | 2/2005 |
|---|---|---|
| CN | 101567906 A | 10/2009 |
| CN | 101957846 A | 1/2011 |
| CN | 102279868 A | 12/2011 |
| CN | 102930022 A | 2/2013 |

OTHER PUBLICATIONS

Partial English Translation and Abstract of Chinese Patent Application No. CN101567906, Part 2, Mar. 26, 2016, 3 pages.
Partial English Translation and Abstract of Chinese Patent Application No. CN101957846, Part 1, Mar. 26, 2016, 3 pages.
Partial English Translation and Abstract of Chinese Patent Application No. CN101957846, Part 2, Mar. 26, 2016, 2 pages.
"Working with language in HTML," XP055303222, Retrieved from the internet: URL: http://wayback.archive.org/web/20131121152502/http://www.w3.org/International/tutorials/language-dec1 [retrieved on Sep. 16, 2016], Nov. 21, 2013, 4 pages.
"Embedded content—HTML5," XP055303232, Retrieved from the Internet: URL:http://wayback.archive.org/web/20131119064818/http://www.w3.org/TR/html5/embedded-content-0.html [Retrieved on Sep. 16, 2016], Nov. 19, 2016, 115 pages.
"Using HTML5 audio and video—Web developer guide," XP055303269, Retrieved from the Internet: URL: http://wayback.archive.org/web/20131108012437/https://developer.mozilla.org/en-US/docs/Web/Guide/HTML/Using_HTML5_audio_and_video [retrieved on Sep. 16, 2009], Nov. 8, 2013, 6 pages.
Foreign Communication From a Counterpart Application, European Application No. 13898470.3, Extended European Search Report dated Sep. 29, 2016, 8 pages.
Foreign Communication From a Counterpart Application, PCT Application No. PCT/CN2013/088220, English Translation of International Search Report dated Sep. 2, 2014, 2 pages.
Foreign Communication From a Counterpart Application, PCT Application No. PCT/CN2013/088220, English Translation of International Written Opinion dated Sep. 2, 2014, 8 pages.
Machine Translation and Abstract of Chinese Publication No. CN102930022, Feb. 13, 2013, 29 pages.
Foreign Communication From a Counterpart Application, Chinese Application No. 201380072560.1, Chinese Office Action dated Nov. 29, 2017, 7 pages.

* cited by examiner

METHOD AND APPARATUS FOR ACQUIRING NETWORK RESOURCE

CROSS-REFERENCE TO RELATED APPLICATIONS

This application is a U.S. National Stage of International Application No. PCT/CN2013/088220, filed on Nov. 29, 2013, which is hereby incorporated by reference in its entirety.

TECHNICAL FIELD

Embodiments of the present disclosure relate to the field of communications technologies, and in particular, to a method and an apparatus for acquiring a network resource.

BACKGROUND

At present, to meet a requirement that different users watch a media file on a website, one website has media files of different language versions, for example, a same movie has an English version, a Chinese version, a Russian version, and the like, and when a user watches a movie, the user may select a version that meets a language requirement of the user to play.

Generally, in the prior art, the foregoing function is implemented using the following two technologies. A first technology is that a website developer develops code or a web page script language on a server side such that a media resource of a specific language version is selected for a user on the server side according to information about a language selected by the user or language configuration information of a local terminal of the user, and a second technology is that media files of all versions are listed on a web page, these files are traversed using script code of a client, and a media file of a corresponding language version is selected for a user according to client configuration information.

When a language version changes, for example, increase, decrease, or update of the version, in the first technology, the website developer has to modify code and a database on the server side, and in the second technology, the website developer has to modify script code on a web page client, and as a result, a workload of the website developer is increased.

SUMMARY

Embodiments of the present disclosure provide a method and an apparatus for acquiring a network resource such that a browser can automatically select a media file of a specified language version according to a language preference of a user, thereby reducing a workload of a website developer.

According to a first aspect, an embodiment of the present disclosure provides a method for acquiring a network resource, including extracting language configuration information of a browser, extracting language information from the language configuration information, and placing the language information into a language list, sending a hypertext transfer protocol (HTTP) request to a web server to request a media play page or a media list page, loading a web page returned by the web server, and locating a position of a media element, matching a value of a language attribute of a specified resource element in the media element with the language information in the language list, and selecting a media resource address, and according to the media resource address, requesting a media resource from the web server and loading the media resource.

In a first possible implementation manner of the first aspect, the extracting language configuration information of a browser includes extracting the language configuration information of the browser and language setting information of a user operating system, and performing selection according to a language configuration information priority of the browser and a language setting information priority of the user operating system, where the language configuration information priority and the language setting information priority are preset or user-selected.

With reference to the first aspect or the first possible implementation manner of the first aspect, in a second possible implementation manner of the first aspect, the extracting language configuration information of a browser, extracting language information from the language configuration information, and placing the language information into a language list includes separating a character string in the language configuration information into different pieces of language information according to a comma, and successively placing separated language information into the language list, where if there is a semicolon in the separated language information, a character string preceding the semicolon is extracted. Otherwise, an entire character string is extracted.

With reference to the first aspect, in a third possible implementation manner of the first aspect, before the extracting language configuration information of a browser, the method further includes adding setting information of a language preference of each of a video, audio, and a subtitle to a language configuration of the browser, and the extracting language configuration information of a browser, extracting language information from the language configuration information, and placing the language information into a language list includes extracting, from the browser, the setting information of the language preference of each of the video, the audio, and the subtitle, and placing the setting information into the language list.

With reference to the third possible implementation manner of the first aspect, in a fourth possible implementation manner of the first aspect, the extracting, from the browser, the setting information of the language preference of each of the video, the audio, and the subtitle, and placing the setting information into the language list includes connecting language information in the setting information of the language preference of each of the video, the audio, and the subtitle using a comma, to obtain a character string, and separating the character string into different pieces of language information according to the comma, and successively placing the language information into a corresponding language list of the video, the audio, or the subtitle, where if there is a semicolon in the language information, a character string preceding the semicolon is extracted. Otherwise, an entire character string is extracted.

With reference to any one of the first aspect to the fourth possible implementation manner of the first aspect, in a fifth possible implementation manner of the first aspect, the matching a value of a language attribute of a specified resource element in the media element with the language information in the language list, and selecting a media resource address includes, when the specified resource element in the media element has a language attribute, successively extracting the language information in the language list, and successively matching the extracted language information with values of language attributes of all specified resource elements in the media element, and if there is a matched value of a language attribute of a first specified resource element, selecting a media resource address specified by a value of a resource address attribute of the first specified resource element. Otherwise, selecting a media resource address specified by a value of a resource address attribute of a resource element that is first specified in the media element, or when the specified resource element in the media element has no language attribute, selecting a media resource address specified by a value of a resource address attribute of a resource element that is first specified in the media element.

With reference to the fifth possible implementation manner of the first aspect, in a sixth possible implementation manner of the first aspect, the media element includes a video element, an audio element, and a subtitle element.

According to a second aspect, an embodiment of the present disclosure provides an apparatus for acquiring a network resource, including an extracting module configured to extract language configuration information of a browser, extract language information from the language configuration information, and place the language information into a language list, a sending module configured to send a HTTP request to a web server to request a media play page or a media list page, and a processing module configured to load a web page returned by the web server, and locate a position of a first media element corresponding to the first media resource address, where the first media element includes a first video element, a first audio element, and a first subtitle element, where the processing module is further configured to match a value of a language attribute of a specified resource element in the media element with the language information in the language list, and select a media resource address. and the processing module is further configured to, according to the media resource address, request a media resource from the web server and load the media resource.

In a first possible implementation manner of the second aspect, the extracting module is configured to extract the language configuration information of the browser and language setting information of a user operating system, and perform selection according to a language configuration information priority of the browser and a language setting information priority of the user operating system, where the language configuration information priority and the language setting information priority are preset or user-selected.

With reference to the second aspect or the first possible implementation manner of the second aspect, in a second possible implementation manner of the second aspect, the extracting module is further configured to separate a character string in the language configuration information into different pieces of language information according to a comma, and successively place separated language information into the language list, where if there is a semicolon in the separated language information, a character string preceding the semicolon is extracted. Otherwise, an entire character string is extracted.

With reference to the second aspect, in a third possible implementation manner of the second aspect, the apparatus further includes an adding module configured to, before the extracting module extracts the language configuration information of the browser, add setting information of a language preference of each of a video, audio, and a subtitle to a language configuration of the browser, where the extracting module is configured to extract, from the browser, the setting information of the language preference of each of the video, the audio, and the subtitle, and place the setting information into the language list.

With reference to the third possible implementation manner of the second aspect, in a fourth possible implementation manner of the second aspect, the extracting module is further configured to connect language information in the setting information of the language preference of each of the video, the audio, and the subtitle using a comma, to obtain a character string, and separate the character string into different pieces of language information according to the comma, and successively place the language information into a corresponding language list of the video, the audio, or the subtitle, where if there is a semicolon in the language information, a character string preceding the semicolon is extracted. Otherwise, an entire character string is extracted.

With reference to the method in any one of the second aspect to the fourth possible implementation manner of the second aspect, in a fifth possible implementation manner of the second aspect, the processing module is configured to, when the specified resource element in the media element has a language attribute, successively extract the language information in the language list, and successively match the extracted language information with values of language attributes of all specified resource elements in the media element, and if there is a matched value of a language attribute of a first specified resource element, select a media resource address specified by a value of a resource address attribute of the first specified resource element. Otherwise, select a media resource address specified by a value of a resource address attribute of a resource element that is first specified in the media element, or when the specified resource element in the media element has no language attribute, select a media resource address specified by a value of a resource address attribute of a resource element that is first specified in the media element.

With reference to the fifth possible implementation manner of the second aspect, in a sixth possible implementation manner of the second aspect, the media element includes a video element, an audio element, and a subtitle element.

According to the method and the apparatus for acquiring a network resource provided in the embodiments of the present disclosure, before sending an HTTP request to request a web page, a browser extracts language configuration information of the browser, extracts language information from the language configuration information, and places the language information into a language list. After loading a web page returned by a web server, and locating a position of a media element, the browser matches a value of a language attribute of a specified resource element in the media element with the language information in the language list, selects a media resource address, and finally according to the media resource address, requests a media resource from the web server and loads the media resource. In this way, the browser can automatically select a media file of a specified language version according to a language preference of a user, thereby reducing a workload of a website developer. In addition, the user does not need to perform manual selection, thereby enhancing user experience.

BRIEF DESCRIPTION OF DRAWINGS

To describe the technical solutions in the embodiments of the present disclosure or in the prior art more clearly, the following briefly introduces the accompanying drawings required for describing the embodiments or the prior art. The accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1:
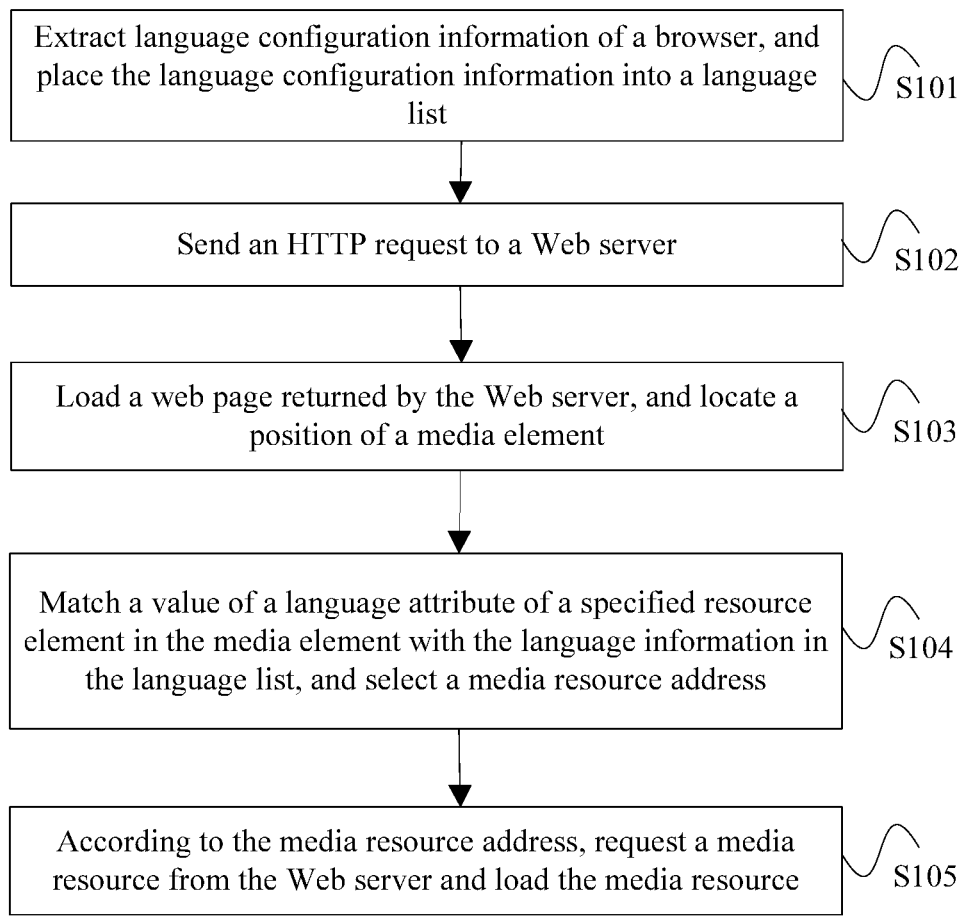
FIG. 1 is a flowchart of Embodiment 1 of a method for acquiring a network resource according to the present disclosure.

FIG. 1 is a flowchart of Embodiment 1 of a method for acquiring a network resource according to the present disclosure. An example in which a browser is used as an execution body is used for description in this embodiment. As shown in FIG. 1, the method in this embodiment may include the following steps.

Step S101: Extract language configuration information of a browser, extract language information from the language configuration information, and place the language information into a language list.

Furthermore, there are two implementable manners for extracting the language configuration information of the browser. A first implementable manner will be as follows.

Step S101a: Extract the language configuration information of the browser and language setting information of a user operating system, and perform selection according to a language configuration information priority of the browser and a language setting information priority of the user operating system, where the language configuration information priority and the language setting information priority are preset or user-selected.

In the foregoing two implementation manners, the extracting language configuration information of a browser, and placing the language configuration information into a language list, for example, may be separating a character string in the language configuration information into different pieces of language information according to a comma, and successively placing separated language information into the language list, where if there is a semicolon in the separated language information, a character string preceding the semicolon is extracted. Otherwise, an entire character string is extracted.

In the other implementable manner, before the extracting language configuration information of a browser, the method further includes the following steps.

Step S101b: Add setting information of a language preference of each of a video, audio, and a subtitle to a language configuration of the browser.

Step S101 may be further implemented as follows.

Step S101c: Extract, from the browser, the setting information of the language preference of each of the video, the audio, and the subtitle, and place the setting information into a corresponding language list of the video, the audio, or the subtitle.

Furthermore, the step S101c is as follows. Connect language information in the setting information of the language preference of each of the video, the audio, and the subtitle using a comma, to obtain a character string; and separate the character string into different pieces of language information according to the comma, and successively place the language information into the corresponding language list of the video, the audio, or the subtitle, where if there is a semicolon in the language information, a character string preceding the semicolon is extracted. Otherwise, an entire character string is extracted.

Step S102: Send an HTTP request to a web server to request a media play page or a media list page, for example, the browser sends the HTTP request to request a page of a video play website.

Step S103: Load a web page returned by the web server, and locate a position of a media element.

Step S104: Match a value of a language attribute of a specified resource element in the media element with the language information in the language list, and select a media resource address.

Step S105: According to the media resource address, request a media resource from the web server and load the media resource.

Furthermore, the browser matches the value of the language attribute of the specified resource element in the media element with the language information in the language list, and selects the media resource address may be when the specified resource element in the media element has a language attribute, successively extracting the language information in the language list, and successively matching the extracted language information with values of language attributes of all specified resource elements in the media element, and if there is a matched value of a language attribute of a first specified resource element, selecting a media resource address specified by a value of a resource address attribute of the first specified resource element. Otherwise, selecting a media resource address specified by a value of a resource address attribute of a resource element that is first specified in the media element, or when the specified resource element in the media element has no language attribute, selecting a media resource address specified by a value of a resource address attribute of a resource element that is first specified in the media element.

Then, according to the media resource address, the browser requests the media resource from the web server, loads the media resource, and presents the web page to the user. A media file clicked and played by the user is exactly a media file matching a language that the user prefers.

The media element includes a video element, an audio element, and a subtitle element.

For the video element, step S104 is, when a specified resource element in the video element has a language attribute, successively extracting the language information in the language list, and matching the extracted language information with a value of a language attribute of the specified resource element in the video element, and if there is a matched value of a language attribute of a first specified resource element, selecting a video resource address specified by a value of a resource address attribute of the first specified resource element. Otherwise, selecting a video resource address specified by a value of a resource address attribute of a resource element that is first specified in the video element, or when a specified resource element in the video element has no language attribute, selecting a video resource address specified by a value of a resource address attribute of a resource element that is first specified in the video element.

For the audio element, step S104 is, when a specified resource element in the audio element has a language attribute, successively extracting the language information in the language list, and matching the extracted language information with a value of a language attribute of the specified resource element in the audio element, and if there is a matched value of a language attribute of a first specified resource element, selecting an audio resource address specified by a value of a resource address attribute of the first specified resource element. Otherwise, selecting an audio resource address specified by a value of a resource address attribute of a resource element that is first specified in the audio element, or when a specified resource element in the audio element has no language attribute, selecting an audio resource address specified by a value of a resource address attribute of a resource element that is first specified in the audio element.

For the subtitle element, step S104 is, when a specified subtitle element in the video element has a language attribute, successively extracting the language information in the language list, and matching the extracted language information with a value of a language attribute of the specified subtitle element in the video element, and if there is a matched value of a language attribute of a first specified subtitle element, selecting a subtitle resource address specified by a value of a resource address attribute of the first specified subtitle element. Otherwise, selecting a subtitle resource address specified by a value of a resource address attribute of a subtitle element that is first specified in the video element, or when a specified subtitle element in the video element has no language attribute, selecting a subtitle resource address specified by a value of a resource address attribute of a subtitle element that is first specified in the video element.

According to the method for acquiring a network resource provided in this embodiment, before sending an HTTP request to request a web page, a browser extracts language configuration information of the browser, extracts language information from the language configuration information, and places the language information into a language list. After loading a web page returned by a web server, and locating a position of a media element, the browser matches a value of a language attribute of a specified resource element in the media element with the language information in the language list, selects a media resource address, and finally according to the media resource address, requests a media resource from the web server and loads the media resource. In this way, the browser can automatically select a media file of a specified language version according to a language preference of a user, which reduces a workload of a website developer. In addition, the user does not need to perform manual selection, thereby enhancing user experience.

The following describes the technical solution of the foregoing method embodiment in detail with reference to three specific embodiments.

Figure 2:
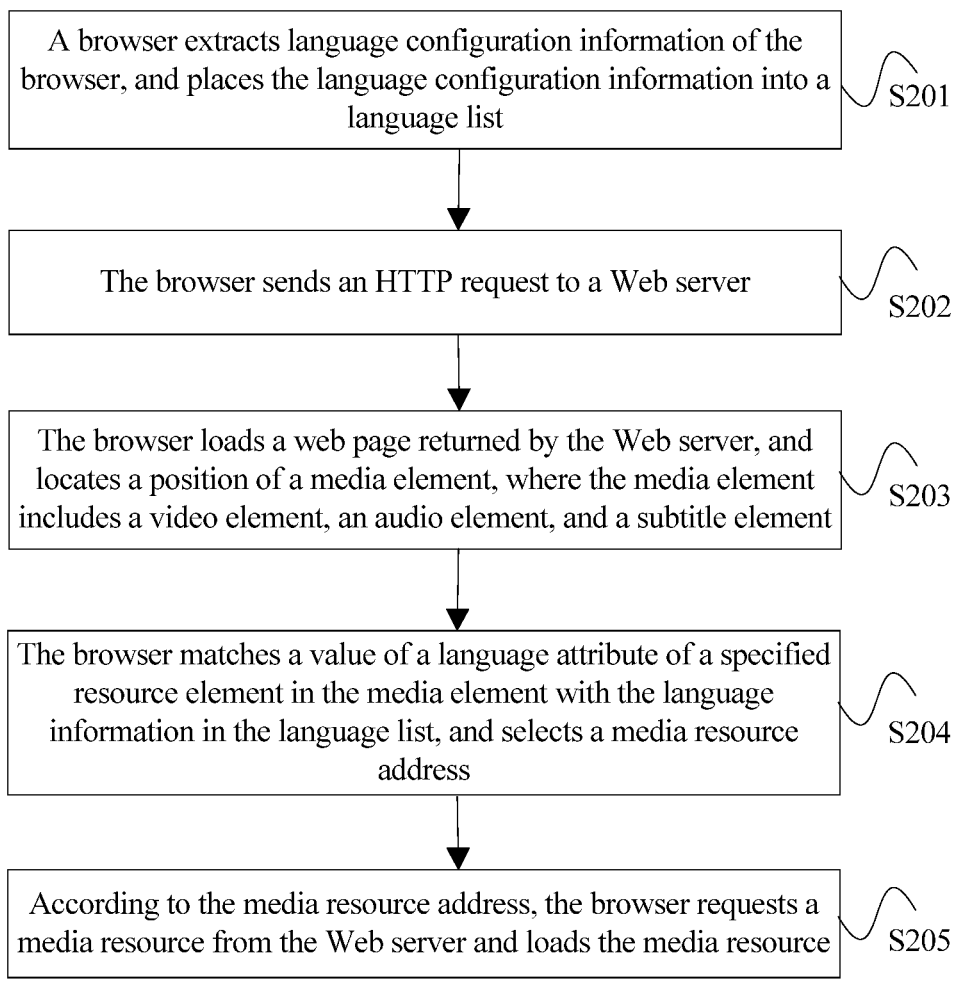
FIG. 2 is a flowchart of Embodiment 2 of a method for acquiring a network resource according to the present disclosure.

FIG. 2 is a flowchart of Embodiment 2 of a method for acquiring a network resource according to the present disclosure. As shown in FIG. 2, the method in this embodiment may include the following steps.

Step S201: A browser extracts language configuration information of the browser, extracts language information from the language configuration information, and places the language information into a language list.

Furthermore, step S201 may be as follows. Separate a character string in the language configuration information into different pieces of language information according to a comma, and successively place separated language information into the language list. If there is a semicolon in the separated language information, a character string preceding the semicolon is extracted; otherwise, an entire character string is extracted.

For example, the language configuration information of the browser is zh-CN,zh;q=0.8,de;q=0.6, where q is a weight, and if there is no q, the weight is 1 by default, and a weight of zh-CN is 1. An extracting process is as follows.

The character string is separated according to "," in the character string, for example, the character string is separated into three parts: [zh-CN], [zh;q=0.8], and [de;q=0.6]. If a separated part has a ";", a character string preceding ";" is extracted. For example, zh is extracted from zh;q=0.8. Otherwise, an entire character string is extracted. Finally, extracted character strings [zh-CN], [zh], and [de] are successively placed into the language list.

Step S202: The browser sends an HTTP request to a web server to request a media play page or a media list page.

Step S203: The browser loads a web page returned by the web server, and locates a position of a media element, where the media element includes a video element, an audio element, and a subtitle element.

Step S204: The browser matches a value of a language attribute of a specified resource element in the media element with the language information in the language list, and selects a media resource address.

Step S205: According to the media resource address, the browser requests a media resource from the web server and loads the media resource.

Furthermore, a process of step S204 and step S205 is as follows.

For a video element, a language (lang) attribute of a sub-element (source), that is, a specified resource element, in the video element specifies a language, and an src attribute specifies a video resource address. A specific process is as follows.

Step S1: If the source element has a language attribute, extract the first piece of language information from the language list and successively compare the first piece of language information with language attributes of all source elements. If the first piece of language information can be exactly matched with one of the language attributes, the browser requests a video resource specified by the source element.

Step S2: If the first piece of language information is not matched with the language attributes, traverse other language information in the language list and repeat the step S1 until an exact match is found.

Step S3: If there is no match in step S2, match a character string preceding "-" (if there is no "-", an entire character string is extracted) in each piece of language information in the language list with the language attributes of all the source elements, and if the character string is exactly matched with a language attribute of a source element, the browser requests a video resource specified by the source element.

Step S4: If there is no match in step S3, match the character string preceding "-" in each piece of language information in the language list with character strings preceding "-" (if there is no "-", an entire character string is extracted) in values of the language attributes of all the source elements, and if the character string preceding "-" in each piece of language information is exactly matched with a character string preceding "-" in a value of a language attribute of a source element, the browser requests a video resource specified by the source element.

Step S5: If there is no match in step S4, request a video resource specified by the first source element.

For an audio element, a language (lang) attribute of a sub-element (source) in the audio element specifies a language, and an src attribute specifies a video resource address. Match a language attribute of the audio element with the language information in the language list, and select an audio resource address of a specified language. A specific process in which according to an audio resource address of the specified language, an audio resource of the specified language is requested from the web server and is loaded is the same as a processing process for the foregoing video element, and details are not described herein.

For a subtitle element, a sub-element (track) in a video element specifies the subtitle element, a language (lang) attribute of the track element specifies a language, and an src attribute specifies a subtitle resource address. Match a language attribute of the subtitle element with the language information in the language list, and select an address of a subtitle resource in a specified language. A specific process in which according to the address of the subtitle resource in the specified language, the subtitle resource in the specified language is requested from the web server and is loaded as follows.

Step S1: If the track element has a language attribute, extract the first piece of language information from the language list and successively compare the first piece of language information with values of language attributes of all track elements. If the first piece of language information can be exactly matched with one of the language attributes, the browser requests a subtitle resource specified by the track element.

Step S2: If the first piece of language information is not matched with the language attributes, traverse other language information in the language list and repeat the step S1 until an exact match is found.

S3: If there is no match in step S2, match a character string preceding "-" (if there is no "-", an entire character string is extracted) in each piece of language information in the language list with values of the language attributes of all the track elements, and if the character string is exactly matched with a value of a language attribute of a track element, the browser requests a subtitle resource specified by the track element.

Step S4: If there is no match in step S3, match the character string preceding "-" in each piece of language information in the language list with character strings preceding "-" (if there is no "-", an entire character string is extracted) in the values of the language attributes of all the track elements, and if the character string preceding "-" in each piece of language information is exactly matched with a character string preceding "-" in a value of a language attribute of a track element, the browser requests a subtitle resource specified by the track element.

Step S5: If there is no match in step S4, request a subtitle resource specified by the first track element.

Then, a user can play a media file.

Figure 3:
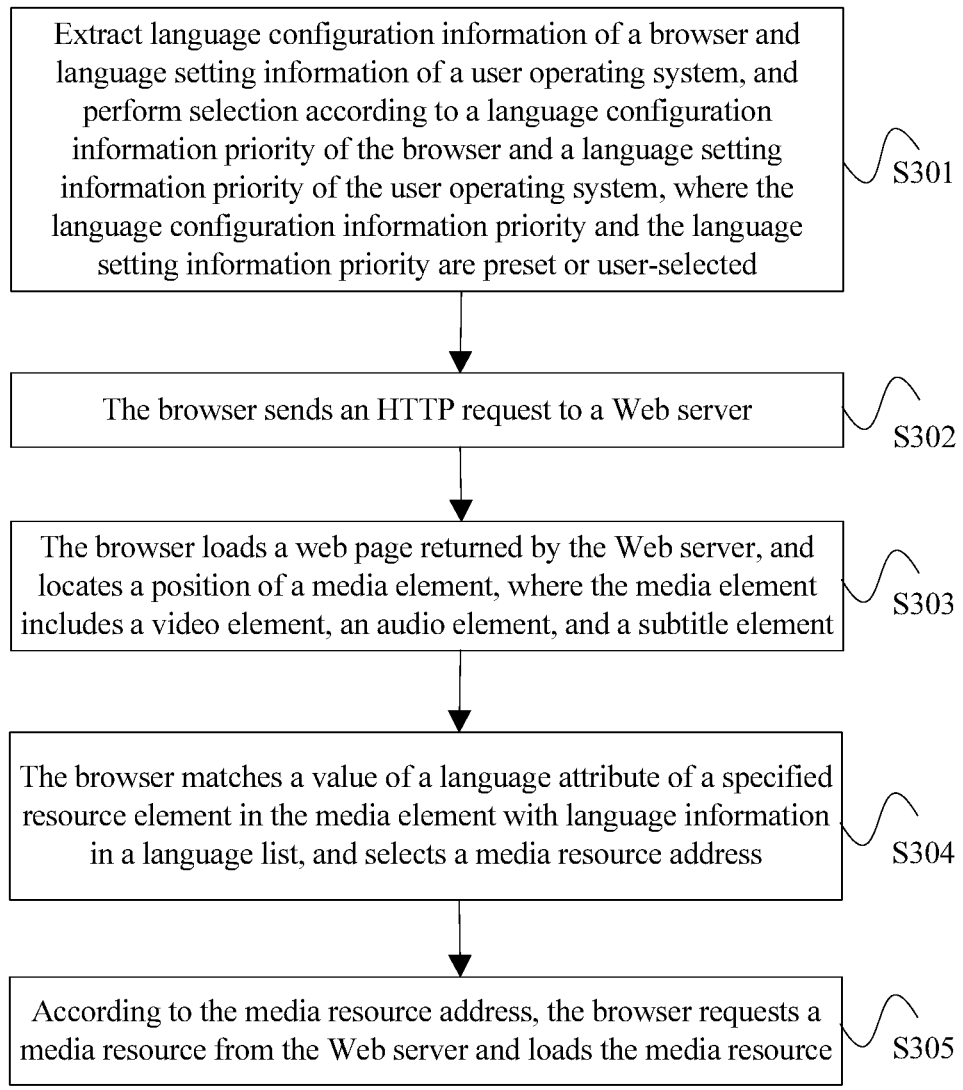
FIG. 3 is a flowchart of Embodiment 3 of a method for acquiring a network resource according to the present disclosure.

FIG. 3 is a flowchart of Embodiment 3 of a method for acquiring a network resource according to the present disclosure. As shown in FIG. 3, the method in this embodiment may include the following steps.

Step S301: Extract language configuration information of a browser and language setting information of a user operating system, and perform selection according to a language configuration information priority of the browser and a language setting information priority of the user operating system, where the language configuration information priority and the language setting information priority are preset or user-selected.

The following steps S302 to S305 are the same as the steps S202 to S205 shown in FIG. 2, and details are not described herein.

Figure 4:
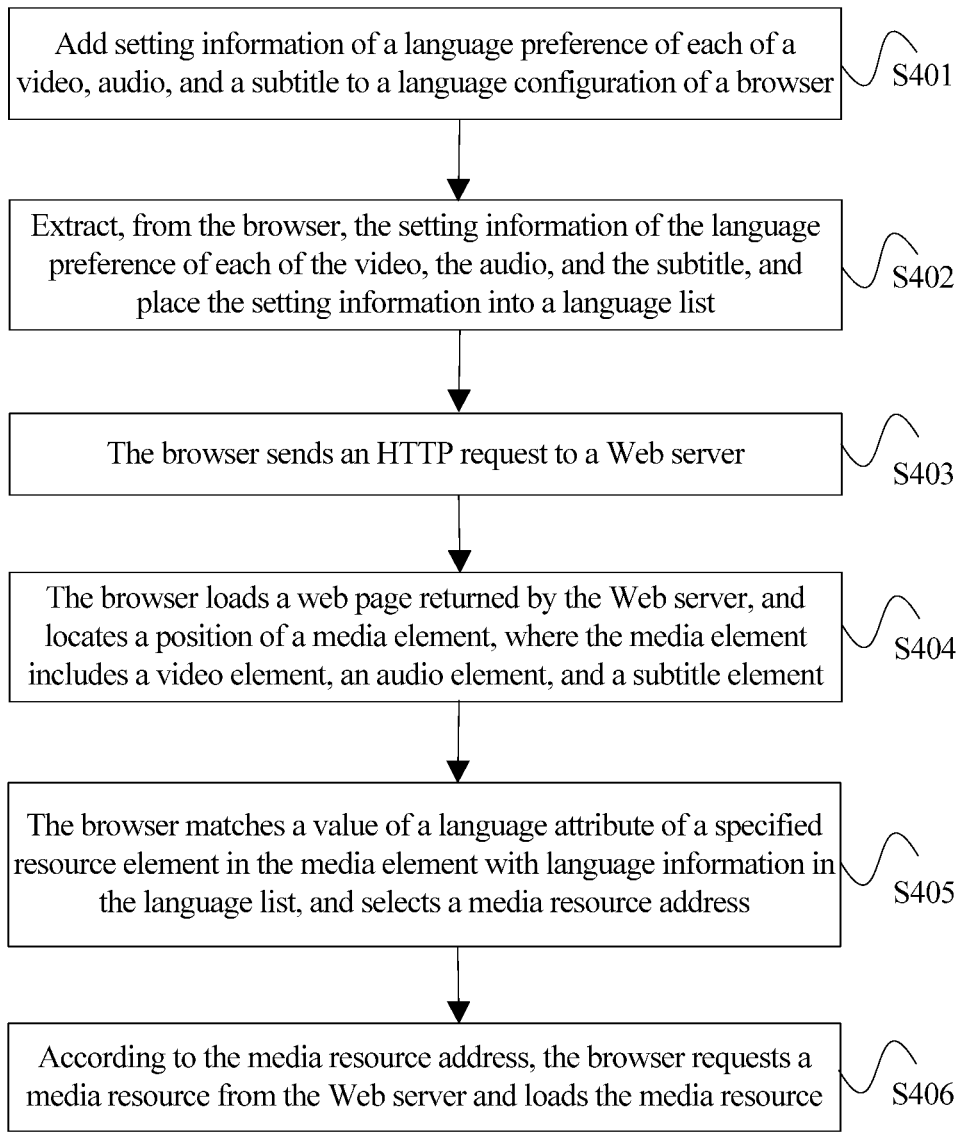
FIG. 4 is a flowchart of Embodiment 4 of a method for acquiring a network resource according to the present disclosure.

FIG. 4 is a flowchart of Embodiment 4 of a method for acquiring a network resource according to the present disclosure. As shown in FIG. 4, the method in this embodiment may include the following steps.

Step S401: Add setting information of a language preference of each of a video, audio, and a subtitle to a language configuration of a browser.

Step S402: Extract, from the browser, the setting information of the language preference of each of the video, the audio, and the subtitle, and place the setting information into a language list.

Furthermore, language information in the setting information of the language preference of each of the video, the audio, and the subtitle is connected using a comma, to obtain a character string. The character string is separated into different pieces of language information according to the comma, and the language information is successively placed into the language list. If there is a semicolon in the language information, a character string preceding the semicolon is extracted. Otherwise, an entire character string is extracted.

The following steps S403 to S406 are the same as the steps S202 to S205 shown in FIG. 2, and details are not described herein.

Figure 5:
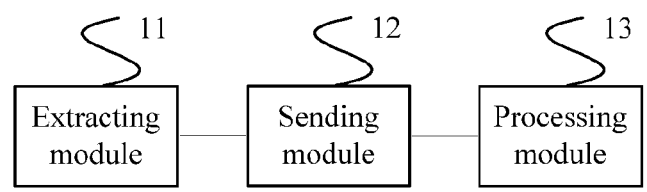
FIG. 5 is a schematic structural diagram of Embodiment 1 of an apparatus for acquiring a network resource according to the present disclosure.

FIG. 5 is a schematic structural diagram of Embodiment 1 of an apparatus for acquiring a network resource according to the present disclosure. As shown in FIG. 5, the apparatus in this embodiment may include an extracting module 11, a sending module 12, and a processing module 13. The extracting module 11 is configured to extract language configuration information of a browser, extract language information from the language configuration information, and place the language information into a language list. The sending module 12 is configured to send a HTTP request to a web server to request a media play page or a media list page. The processing module 13 is configured to load a web page returned by the web server, and locate a position of a first media element corresponding to a first media resource address. The processing module 13 is further configured to match a value of a language attribute of a specified resource element in the media element with the language information in the language list, and select a media resource address. The processing module 13 is further configured to, according to the media resource address, request a media resource from the web server and load the media resource.

In an implementable manner, the extracting module 11 is configured to extract the language configuration information of the browser and language setting information of a user operating system, and perform selection according to a language configuration information priority of the browser and a language setting information priority of the user operating system, where the language configuration information priority and the language setting information priority are preset or user-selected.

The extracting module 11 is further configured to separate a character string in the language configuration information into different pieces of language information according to a comma, and successively place separated language information into the language list. If there is a semicolon in the separated language information, a character string preceding the semicolon is extracted. Otherwise, an entire character string is extracted.

In another implementable manner, the apparatus for acquiring a network resource further includes an adding module, where the adding module is configured to, before the extracting module extracts the language configuration information of the browser, add setting information of a language preference of each of a video, audio, and a subtitle to a language configuration of the browser.

The extracting module 11 is configured to extract, from the browser, the setting information of the language preference of each of the video, the audio, and the subtitle, and place the setting information into the language list.

The extracting module 11 is further configured to connect language information in the setting information of the language preference of each of the video, the audio, and the subtitle using a comma, to obtain a character string, and separate the character string into different pieces of language information according to the comma, and successively place the language information into a corresponding language list of the video, the audio, or the subtitle. If there is a semicolon in the language information, a character string preceding the semicolon is extracted. Otherwise, an entire character string is extracted.

In the foregoing embodiment, the processing module 13 is configured to, when the specified resource element in the media element has a language attribute, successively extract the language information in the language list, and successively match the extracted language information with values of language attributes of all specified resource elements in the media element, and if there is a matched value of a language attribute of a first specified resource element, select a media resource address specified by a value of a resource address attribute of the first specified resource element. Otherwise, select a media resource address specified by a value of a resource address attribute of a resource element that is first specified in the media element, or when the specified resource element in the media element has no language attribute, select a media resource address specified by a value of a resource address attribute of a resource element that is first specified in the media element.

The media element includes a video element, an audio element, and a subtitle element.

The apparatus in this embodiment may be configured to implement the technical solution in the method embodiment shown in FIG. 1, and implementation principles of the apparatus and the method are similar, and details are not described herein.

According to the apparatus for acquiring a network resource provided in this embodiment, before a sending module sends an HTTP request to request a web page, an extracting module extracts language configuration information of a browser, extracts language information from the language configuration information, and places the language information into a language list. After loading a web page returned by a web server, and locating a position of a media element, a processing module matches a value of a language attribute of a specified resource element in the media element with the language information in the language list, selects a media resource address, and finally according to the media resource address, requests a media resource from the web server and loads the media resource. In this way, the browser can automatically select a media file of a specified language version according to a language preference of a user, thereby reducing a workload of a website developer. In addition, the user does not need to perform manual selection, thereby enhancing user experience.

Figure 6:
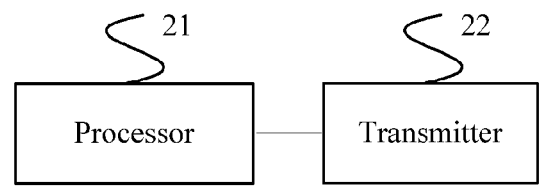
FIG. 6 is a schematic structural diagram of Embodiment 2 of an apparatus for acquiring a network resource according to the present disclosure.

FIG. 6 is a schematic structural diagram of Embodiment 2 of an apparatus for acquiring a network resource according to the present disclosure. As shown in FIG. 6, the apparatus in this embodiment may include a processor 21 and a transmitter 22. The processor 21 is configured to extract language configuration information of a browser, extract language information from the language configuration information, and place the language information into a language list. The transmitter 22 is configured to send an HTTP request to a web server to request a media play page or a media list page. The processor 21 is further configured to load a web page returned by the web server, and locate a position of a first media element corresponding to a first media resource address. The processor 21 is further configured to match a value of a language attribute of a specified resource element in the media element with the language information in the language list, and select a media resource address. The processor 21 is further configured to, according to the media resource address, request a media resource from the web server and load the media resource.

In an implementable manner, the processor 21 is configured to extract the language configuration information of the browser and language setting information of a user operating system, and perform selection according to a language configuration information priority of the browser and a language setting information priority of the user operating system, where the language configuration information priority and the language setting information priority are preset or user-selected.

Further, the processor 21 is further configured to separate a character string in the language configuration information into different pieces of language information according to a comma, and successively place separated language information into the language list. If there is a semicolon in the separated language information, a character string preceding the semicolon is extracted. Otherwise, an entire character string is extracted.

In another implementable manner, the processor 21 is configured to, before extracting the language configuration information of the browser, add setting information of a language preference of each of a video, audio, and a subtitle to a language configuration of the browser.

The processor 21 is configured to extract, from the browser, the setting information of the language preference of each of the video, the audio, and the subtitle, and place the setting information into the language list.

The processor 21 is further configured to connect language information in the setting information of the language preference of each of the video, the audio, and the subtitle using a comma, to obtain a character string, and separate the character string into different pieces of language information according to the comma, and successively place the language information into a corresponding language list of the video, the audio, or the subtitle. If there is a semicolon in the language information, a character string preceding the semicolon is extracted. Otherwise, an entire character string is extracted.

In the foregoing embodiment, the processor 21 is configured to, when the specified resource element in the media element has a language attribute, successively extract the language information in the language list, and successively match the extracted language information with values of language attributes of all specified resource elements in the media element, and if there is a matched value of a language attribute of a first specified resource element, select a media resource address specified by a value of a resource address attribute of the first specified resource element. Otherwise, select a media resource address specified by a value of a resource address attribute of a resource element that is first specified in the media element, or when the specified resource element in the media element has no language attribute, select a media resource address specified by a value of a resource address attribute of a resource element that is first specified in the media element.

The media element includes a video element, an audio element, and a subtitle element.

The apparatus in this embodiment may be configured to implement the technical solution in the method embodiment shown in FIG. 1, and implementation principles of the apparatus and the method are similar, and details are not described herein.

According to the apparatus for acquiring a network resource provided in this embodiment, before a transmitter sends an HTTP request to request a web page, a processor extracts language configuration information of a browser, extracts language information from the language configuration information, and places the language information into a language list. After loading a web page returned by a web server, and locating a position of a media element, the processor matches a value of a language attribute of a specified resource element in the media element with the language information in the language list, selects a media resource address, and finally according to the media resource address, requests a media resource from the web server and loads the media resource. In this way, the browser can automatically select a media file of a specified language version according to a language preference of a user, thereby reducing a workload of a website developer. In addition, the user does not need to perform manual selection, thereby enhancing user experience.

It should be noted herein that the method and the apparatus for acquiring a network resource according to the embodiments are not limited to acquiring of a media resource, and may also be applied to acquiring of a network resource such as an image.

In the several embodiments provided in the present disclosure, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The foregoing software functional unit is stored in a storage medium and includes several instructions for instructing a computer device (which may be a personal computer, a server, or a network device) or a processor to perform a part of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

It may be clearly understood by persons skilled in the art that, for the purpose of convenient and brief description, division of the foregoing function modules is used as an example for illustration. In an actual application, the foregoing functions may be allocated to different function modules and implemented according to a requirement, that is, an inner structure of an apparatus is divided into different function modules to implement all or part of the functions described above. For a detailed working process of the foregoing apparatus, reference may be made to a corresponding process in the foregoing method embodiments, and details are not described herein.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof. However, these modifications or replacements do not make the essence of corresponding technical solutions depart from the scope of the technical solutions in the embodiments of the present disclosure.

What is claimed is:

1. A method for acquiring a network resource, comprising:
    extracting language configuration information of a browser;
    extracting language information from the language configuration information, wherein the language information is included in setting information of a language preference of each of a video, an audio, and a subtitle, and wherein extracting the language information includes:
        connecting the language information in the setting information using a comma to obtain a character string of the video, a character string of the audio, and a character string of the subtitle; and separating the character string of the video, the character string of the audio, and the character string of the subtitle into different pieces of language information according to the comma, wherein when there is a semicolon in the language information, a character string preceding the semicolon is extracted, and wherein when there is no semicolon in the language information, an entire character string is extracted;

storing the language information into a language list by successively storing the language information into a corresponding language list of the video, the audio, or the subtitle;

sending a hypertext transfer protocol (HTTP) request to a web server to request a media play page or a media list page;

loading a web page returned by the web server;

locating a position of a media element;

matching a value of a language attribute of a specified resource element in the media element with the language information in the language list;

selecting a media resource address;

requesting a media resource from the web server according to the media resource address;

loading the media resource; and presenting the web page including the media resource to a user.

2. The method according to claim 1, wherein extracting the language configuration information of the browser comprises:

extracting the language configuration information of the browser and language setting information of a user operating system; and performing selection according to a language configuration information priority of the browser and a language setting information priority of the user operating system, wherein the language configuration information priority and the language setting information priority are preset or user-selected.

3. The method according to claim 1, wherein before extracting the language configuration information of the browser, the method further comprises adding the setting information of the language preference of each of the video, the audio, and the subtitle to the language configuration information of the browser.

4. The method according to claim 1, wherein matching the value of the language attribute of the specified resource element in the media element with the language information in the language list, and wherein selecting the media resource address comprises:

successively extracting the language information in the language list when the specified resource element in the media element has the language attribute;

successively matching the extracted language information with values of language attributes of all specified resource elements in the media element;

selecting the media resource address specified by a value of a resource address attribute of a first specified resource element when there is a matched value of the language attribute of the first specified resource element;

selecting the media resource address specified by the value of the resource address attribute of the resource element that is first specified in the media element when there is no matched value of the language attribute of the first specified resource element; and selecting the media resource address specified by the value of the resource address attribute of the resource element that is first specified in the media element when the specified resource element in the media element has no language attribute.

5. The method according to claim 4, wherein the media element comprises a video element, an audio element, and a subtitle element.

6. An apparatus for acquiring a network resource, comprising:

a memory;

a transceiver; and a processor, wherein the memory, the transceiver and the processor are coupled to and in communication with each other, wherein the processor is configured to:

extract language configuration information of a browser; and extract language information from the language configuration information, wherein the language information is included in setting information of a language preference of each of a video, an audio, and a subtitle, and wherein the processor is configured to extract the language information by:

connecting the language information in the setting information using a comma to obtain a character string of the video, a character string of the audio, and a character string of the subtitle; and separating the character string of the video, the character string of the audio, and the character string of the subtitle into different pieces of language information according to the comma, wherein when there is a semicolon in the language information, a character string preceding the semicolon is extracted, and wherein when there is no semicolon in the language information, an entire character string is extracted, wherein the memory is configured to store the language information into a language list by successively storing the language information into a corresponding language list of the video, the audio, or the subtitle, and wherein the transceiver is configured to:

send a hypertext transfer protocol (HTTP) request to a web server to request a media play page or a media list page; and load a web page returned by the web server, wherein the processor is further configured to:

locate a position of a media element;

match a value of a language attribute of a specified resource element in the media element with the language information in the language list; and select a media resource address;

wherein the transceiver is further configured to:

request a media resource from the web server according to the media resource address; and load the media resource.

7. The apparatus according to claim 6, wherein the processor is further configured to:

extract the language configuration information of the browser and language setting information of a user operating system; and perform selection according to a language configuration information priority of the browser and a language setting information priority of the user operating system, wherein the language configuration information priority and the language setting information priority are preset or user-selected.

8. The apparatus according to claim 6, wherein the processor is further configured to add the setting information of the language preference of each of the video, the audio, and the subtitle to the language configuration information of the browser.

9. The apparatus according to claim 6, wherein the processor is further configured to:
  successively extract the language information in the language list when the specified resource element in the media element has the language attribute;
  successively match the extracted language information with values of language attributes of all specified resource elements in the media element;
  select the media resource address specified by a value of a resource address attribute of a first specified resource element when there is a matched value of the language attribute of the first specified resource element;
  select the media resource address specified by the value of the resource address attribute of the resource element that is first specified in the media element when there is no any matched value of the language attribute of the first specified resource element; and
  select the media resource address specified by the value of the resource address attribute of the resource element that is first specified in the media element when the specified resource element in the media element has no language attribute.

* * * * *

UNITED STATES PATENT AND TRADEMARK OFFICE
CERTIFICATE OF CORRECTION

PATENT NO. : 9,965,468 B2  
APPLICATION NO. : 15/024461  
DATED : May 8, 2018  
INVENTOR(S) : Hao Jing Page 1 of 1

It is certified that error appears in the above-identified patent and that said Letters Patent is hereby corrected as shown below:

Page 2 under Other Publications Line 16 should read:
XP055303269, Retrieved from the Internet: URL:
http://wayback.archive.org/web/20131108012437/https://developer.mozilla.org/en-US/docs/Web/Guide/HTML/Using_HTML5_audio_and_video [retrieved on Sep. 16, 2016]
Nov. 8, 2013, 6 pages.

Signed and Sealed this  
Tenth Day of July, 2018

Andrei Iancu  
*Director of the United States Patent and Trademark Office*